Sept. 9, 1958   W. RETTIG   2,850,961
AUTOMATIC TOASTER
Filed Nov. 27, 1956   2 Sheets-Sheet 1
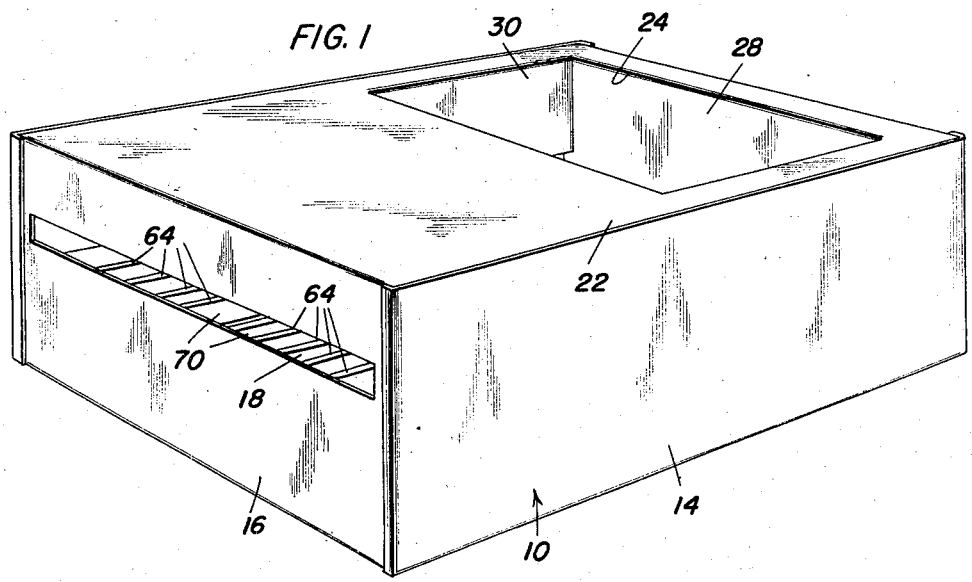
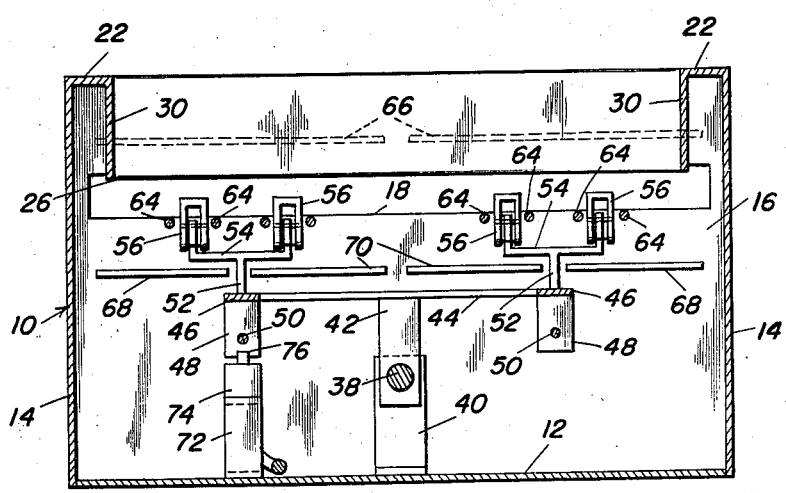
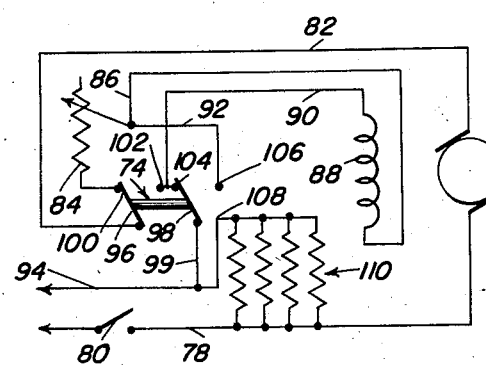
Werner Rettig
INVENTOR
BY Samuel Meerkreebs
ATTORNEY Sept. 9, 1958  W. RETTIG  2,850,961
AUTOMATIC TOASTER
Filed Nov. 27, 1956  2 Sheets-Sheet 2
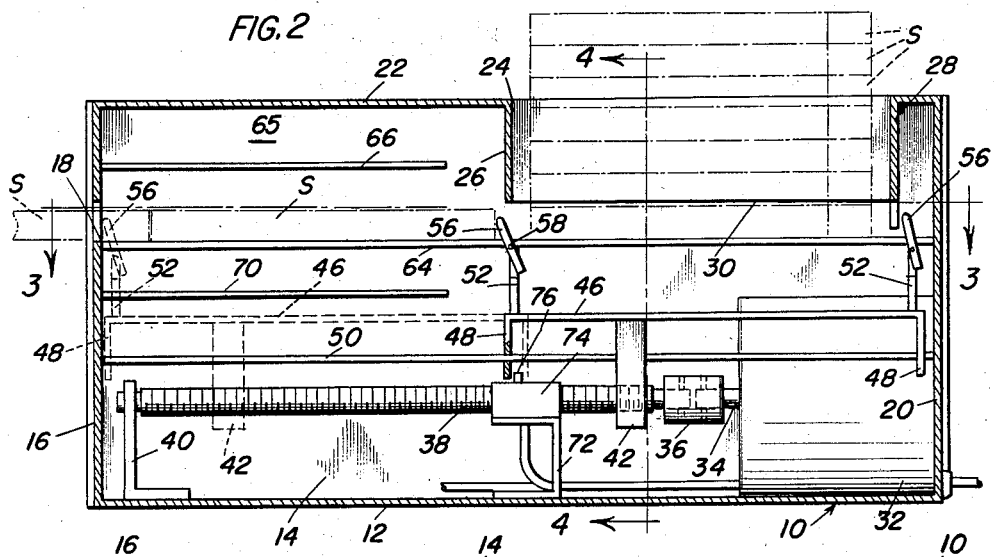
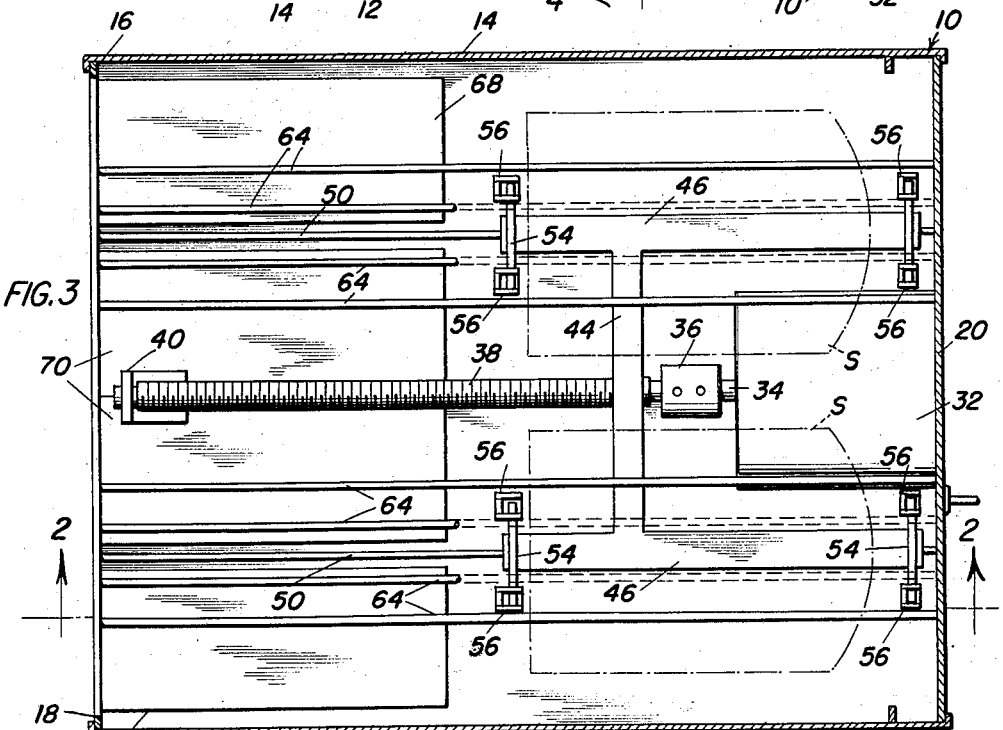
INVENTOR
Werner Rettig
BY Samuel Meerkreebs
ATTORNEY

United States Patent Office 2,850,961
Patented Sept. 9, 1958

2,850,961

AUTOMATIC TOASTER

Werner Rettig, Youbou, British Columbia, Canada

Application November 27, 1956, Serial No. 624,645

5 Claims. (Cl. 99—387)

This invention relates to bread toasters generally, and more particularly has reference to a toaster of the type designed to receive one or more stacks of bread slices and, at periodic intervals, convey the lowermost slice of the stack in proximity to heating elements for toasting of the slice, with the slice being thereafter automatically ejected from the device.

By way of background, it may be noted that it is not new, in and of itself, to provide a toasting machine adapted to receive a stack of superposed bread slices, with the machine being adapted for feeding slices in following order from the bottom of the stack in a path such that the slices so fed will be toasted and subsequently ejected from the machine. Heretofore, however, the devices conceived for this purpose have generally involved the use of conveyor chains, driven by wheels, gears, etc., in an arrangement which has been complicated to such an extent as to detract measurably from the commercial feasibility of the device. Further, in apparatus of this type previously conceived, it has been necessary to increase the overall size of the device, due to the use of the mentioned conveyor chains and related components. This has further militated against the successful commercial exploitation of the devices, since it is obviously desirable that bread toasting apparatus be as compact as possible, thus to occupy a minimum amount of space in a commercial establishment such as a restaurant, hospital, boarding house, or other enterprise in which a machine of this type would advantageously be used.

Still further, the necessity of utilizing conveyors having a continuous movement in one direction has detracted from the adaptability of the prior art devices for regulating the speed with which the bread slices may be advanced from their stacked to their toasting positions, and further, has required in many instances that the heating elements extend over too lengthy an area due to the necessity of toasting the bread slices while they are in movement.

Apart from the above, it has been noted, with respect to toasters of this type that have been heretofore designed, that the amount of bread that can be handled by the toaster in relation to the size thereof is relatively small.

In view of the above, the broad object of the present invention is to provide an automatic toaster of the character described that will not have the various deficiencies noted above in respect to complexity, overall size, amount of bread that can be handled, and control of the speed of operation.

A further object of importance is to provide an automatic toaster as stated which will have a highly simplified bread-advancing mechanism, which mechanism will be particularly designed to permit handling of side-by-side stacks of bread, with bread being fed off the bottom of both stacks simultaneously, through the use of a single drive apparatus common to both of two advancing or conveyor mechanisms.

A further object of importance is to provide a device as stated that will be sure in operation, highly simplified in design, extremely compact in relation to the amount of bread that can be handled thereby, and capable of use over a long period of time with minimum danger of its getting out of order.

Still another object of importance is to provide a novel electrical circuit arrangement for the device which will be designed to provide power for the motor used to operate the bread-advancing means, with said circuit being adapted for effecting automatic reversal of the motor for retraction of the advancing means following the ejection of the bread slices. It is further proposed that the circuit will be adapted for changing the speed of operation of the motor in a manner such that the motor will operate at one speed when the bread is being advanced within the device, and at a different speed when the bread-advancing means is being retracted.

Summarized briefly, the invention includes a housing having a well in which side-by-side stacks of bread slices may be deposited. The housing includes a pair of parallel trackways extending below the well, along which bread slices fed off the bottom of the stacks are advanced toward an ejection opening provided in the front of the housing. A single, reversible motor is provided, rotating a screw on which is threadedly engaged a follower supporting a carriage. The carriage includes twin sets of advancing fingers, so arranged that on operation of the screw in one direction, bread slices will be shifted from the bottoms of the stacks to positions in proximity to the heating elements, and will remain stationary adjacent the heating elements for a predetermined period of time while the carriage is retracted. The arrangement is such that on the next movement of the carriage in a forward direction, the slices previously positioned for toasting will be ejected from the machine and new slices will be advanced to take their places.

The invention, further summarized, includes an electrical circuit such that the reversal of the direction of operation of the motor is effected by tripping of a switch located in the path of the carriage. The tripping of the switch occurs automatically on each movement of the carriage either in a forward or rearward direction to its respective extreme positions. The electrical circuit is further designed so that each time the switch is tripped at the extreme forward position of the carriage, for retraction of the carriage, there will be placed in circuit with the motor a variable resistor. This controls the speed of operation of the motor when it is operating in a direction to retract the carriage. There is thus provided a means, effected through adjustment of the variable resister, for regulating the period of time during which a bread slice is exposed to the heating elements for toasting.

Other objects will appear from the following description, the claims appended thereto, and from the annexed drawing, in which like reference characters designate like parts throughout the several views, and wherein:

Figure 1 is a perspective view of an automatic toaster formed according to the present invention;

Figure 2 is a longitudinal sectional view therethrough, a plurality of bread slices being illustrated in dotted lines, in position to be acted upon by the machine, a carriage being shown in full and dotted lines in retracted and advanced extreme positions respectively;

Figure 3 is a plan sectional view substantially on line 3—3 of Figure 2, in which the dotted lines show the bread slices upon their associated trackways;

Figure 4 is a transverse sectional view substantially on line 4—4 of Figure 2;

Figure 5 is a schematic showing of the electrical circuit employed in the toaster; and Figure 6 is a fragmentary perspective view illustrating one of the dog or finger units.

Referring to the drawings in detail, designated generally by the reference numeral 10 is a rectangular housing, formed of sheet metal or any other suitable material. The housing material may be chrome-plated or otherwise surface-treated to impart the desired finished appearance to the housing.

The housing 10 includes a flat, rectangular bottom plate 12, integral or otherwise made rigid with upwardly projecting side walls 14, a front wall 16 having an elongated ejection opening 18, and a back wall 20. A flat top wall 22 is also integral or otherwise rigid with the respective walls of the device. Wall 22 is formed, adjacent the rear end of the housing, with a large, rectangular opening 24 so proportioned that side-by-side stacks of bread slices S (see Figures 2 and 3) may be readily deposited within the opening.

Within the housing, there is provided a well, within which the stacks of bread slices extend. The well is defined by the provision, on the edge of opening 24, of a flange depending a short distance within the housing. The flange includes a front flange portion 26, a back flange portion 28, and side flange portions 30. The side flange portions are set inwardly from and are in planes parallel to the respective side walls 14. The rear or back flange portion 28 is correspondingly spaced forwardly from the back wall 20.

In the illustrated embodiment, the well occupies substantially the full area of the portion of the top of the housing lying between the midlength point of the housing and the back wall thereof. However, this is merely a presently preferred embodiment. In practice, a commercial embodiment may have a well of different shape, and a different size in relation to the overall area of the top wall of the housing.

Below the well there is mounted, in position against the back wall of the housing, an electric motor 32 of the reversing type. This is disposed medially between the opposite sides of the housing as shown in Figure 3. It will be understood that the motor will be mounted upon suitable brackets or equivalent means to insure its being maintained in a stationary position.

Projecting forwardly, horizontally from the motor is the shaft 34 thereof, engaged in one end of a drive coupling 36. In the other end of the coupling is engaged the reduced rear end of an elongated screw 38, the front end of which is formed with a reduced axial extension journalled in an angular bracket 40 fixedly mounted upon the bottom wall of the housing adjacent the front wall 16.

It will be understood that the threads of the screw will be selected according to the desires of the manufacturers and a thread considered to be particularly suitable would be a "National Fine" thread. This of course represents a detail of design not affecting the basic nature of the invention.

Threadedly engaged with the screw of spindle 38 is a follower block 42, which is of rectangular formation and projects upwardly from the screw as shown in Figure 2. The follower block, at its upper end, is fixedly secured to the underside of a carriage lying in a horizontal plane. The carriage is formed from a single piece of sheet metal material, having the general shape of an H when viewed in plan as best shown in Figure 3. Thus, the carriage includes a cross member 44 constituting the portion of the carriage fixedly secured to the block, and side members 46 integral intermediate their ends with the opposite ends of the cross member. The side members 46 are formed at their opposite extremities with depending extensions 48, apertured to receive guide rods 50 fixedly connected between the front and back walls 16, 20, respectively, of the device.

It will thus be seen that on operation of the motor, the follower 42 will be shifted longitudinally of the rotating spindle 38, with the carriage thus traveling in its horizontal plane between the full and dotted line positions thereof shown in Figure 2. The carriage will be supported in its horizontal position, and will be guided in its straight line movement, by the guide rods 50, which are slidably engaged in the openings of the depending extensions 48.

On the opposite ends of each side member 46 of the carriage, upwardly projecting, Y-shaped yokes are fixedly mounted. Each yoke lies in a vertical plane normal to the line of movement of the carriage. Each yoke, thus, includes a standard 52 fixedly attached at its lower end to the associated side member 46, and a cross piece 54 rigid with the upper end of the standard and terminating at its ends in upwardly projecting extensions.

On each of the upwardly projecting extensions of each yoke, a dog or advancing finger is pivotally mounted. The fingers are shown to particular advantages in Figure 6, each including identically formed, laterally spaced finger elements 56 receiving the associated extension of the yoke and pivotally connected to said extension at 58. Connected between the front ends of the finger elements 56 is a spacer 60, and a cross pin 62 is similarly connected between the rear ends of said fingers.

The fingers are pivoted at a point along their lengths such as to overbalance the same along their pivots just sufficiently to cause them to normally assume the inclined positions shown in Figures 2 and 6. In other words, each time a finger is biased counterclockwise in Figure 2 about its pivot axis 58 to a horizontal or substantially horizontal position, it will tend to swing clockwise, back to its inclined position, so that it can engage in back of the lowermost slice S of the stack when the carriage is retracted. The cross pins 62, by engaging the base portions of the upwardly projecting extensions of the yokes, limit the movement of the fingers clockwise about their pivot axes, beyond the steeply inclined positions shown in Figure 2.

As shown in Figure 3, the arrangement is one in which the carriage has, at each of its respectively opposite sides, front and rear pairs of fingers, the fingers of each pair being carried by one of the Y-shaped yokes. The fingers of each pair will be symmetrically located at opposite sides of the longitudinal center line of the bread slice S to be advanced thereby, as shown in Figure 3, and will also be disposed in close proximity to a plurality of support rods 64 on which the bread slices will be supported for movement within the housing. The several support rods define trackways within the housing, with each rod being connected between the front and rear walls of the housing as shown in Figure 3. Each trackway includes four of the rods 64, arranged in laterally spaced pairs with each finger being disposed between the rods of a pair. The several rods lie in a horizontal plane below the upper ends of the fingers when the fingers are in their normal, inclined positions, as shown in Figure 2, with the rods being spaced downwardly from the lower end of the bread-receiving well a distance slightly greater than the thickness of a single bread slice S.

The toasting of the bread is accomplished in a heating space 65 within the housing forwardly of the well, between the front wall 26 of the well and the front wall 16 of the housing. Heating elements are provided, spaced transversely of the housing over substantially the full width thereof, with one set of heating elements lying in a horizontal plane above the trackways, and the other set lying in a horizontal plane below the trackways, thus to toast the bread evenly on both sides as it moves forwardly within the housing.

Thus, the upper set of heating elements comprises (see Figures 2 and 4) traversely spaced, rectangular heating elements 66, which will be spaced a short distance of the upper surfaces of the bread slices S, when the bread slices have been advanced forwardly from the stacks and are left for a predetermined time interval in position to the toasted. The other set of elements lies in a common horizontal plane below the trackway (see Figure 4) and comprises outer elements 68 and inner elements 70, all in a common horizontal plane.

Below one side of the carriage, there is fixedly mounted upon the bottom wall 12 an upwardly projecting support bracket 72 (see Figure 2) on which is mounted a double pole, double throw switch 74 having an operating handle 76 disposed in the path of movement of the depending extensions 48 of the side member 46 disposed immediately thereabove.

The handle, thus, will be thrown in one direction when the carriage reaches the extreme forward position thereof shown in dotted lines in Figure 2. It will be thrown in the opposite direction when the carriage has moved from left to right in Figure 2 fully to its extreme retracted position, which position the carriage is approaching in Figure 2, and which is just to the right of the full line carriage position shown in this figure of the drawing.

Considering now the circuit employed in the device, reference should be had to Figure 5. As shown, a lead 78 extends from one side of a source of electric power, such as a conventional 110 volt A. C. supply. Controlling flow of current through said lead is a main switch 80, which is manually operated between "on" and "off" positions. Switch 80 is left in open position when the device is not in operation, and is manually thrown to closed position for the purpose of initiating operation of the device.

Lead 78 extends through one terminal of a reversing electric motor 32, to the other terminal of which is connected the lead 82. Included in the circuit is a variable resistor 84, the adjustably positioned arm of which is connected to a lead 86 extending to one terminal of a series field 88, to the other terminal of which is connected a lead 90.

Also connected with the arm of the variable resistor is a lead 92, which is thus connected electrically to the lead 86.

The other side of the power supply has been designated by a lead 94. The switch 74 is shown as including switch arms 96, 98 simultaneously operated by the handle 76, the arm 98 being connected by a lead 99 to the conductor 94.

Arm 96 is operated between terminals 100, 102, respectively connected to the resistor 84 and lead 90. Arm 98 is operable between terminals 104, 106, respectively connected to leads 90, 92. At 108 there has been designated a lead connected with lead 94 at the junction of lead 94 with lead 99. Connected between the lead 108 and the lead 78 are the several heating elements, generally designated in the schematic showing of Figure 5 at 110. The series of heating elements 110 includes the elements 66, 68, 70.

In accordance with the invention, the extent to which the bread is toasted, that is, light, medium, dark, or shades occurring between these main adjustments, is not controlled by the amount of current fed through the heating elements 110, since this current is kep constant. Rather, the shade to which the slices are toasted is controlled by the extent of time during which the bread slices are permitted to remain in proximity to the heating elements, that is, in position within the housing to the left of the well when viewing the device as in Figure 2. This, in turn, is controlled by the speed with which the carriage is retracted, in a manner to be described in detail hereinafter.

In use of the device, side-by-side stacks of slices S are deposited within the well. In this connection, the toaster, though of compact size and simplified design, is adapted to accommodate two full loaves of bread at one time, with slices being fed off the bottoms of the stacks simultaneously, and being toasted and ejected in pairs. This is particularly desirable in connection with use of the toaster for the making of sandwiches. Such use would, as will be readily appreciated, be among the most common uses to which the toaster would be put.

In any event, with the stacks disposed within the well, the lowermost slices will be supported upon the trackways defined by the rods 64. The carriage will initially be in the full line position of Figure 2. To start operation of the device, one closes the main switch 80. Motor 32 is thus energized, and follower block 42 begins to move from the full to the dotted line position of Figure 2. As a result, the rear sets of fingers, shown at the right in Figure 2, engage in back of the lowermost slices S, and advance the same within the housing until said slices are disposed wholly forwardly of the well but are still confined entirely within the housing, between the upper and lower sets of heating elements.

The rear sets of fingers, accordingly, engage in back of the bread slices to advance the same to position between the heating elements, with the carriage moving to the dotted line position of Figure 2. Following movement of the lowermost slices forwardly from the stacks, the stacks will gravitate to dispose other slices in lowermost position below the plane of the bottom of the well.

When the carriage reaches its forwardmost position, the rear extension 48 of that side member 46 located above the switch 74 will trip the switch handle 76, thus throwing the switch to its opposite position and causing reversal of the motor. Screw 38 will now rotate in opposite directions, retracting the carriage to its full line position of Figure 2. The fingers 56 are free to move counterclockwise about their pivots 58, so that during retraction of the carriage the forward set of fingers will be so pivoted, by engagement against the front ends of the advanced slices. Said advanced slices will thus remain stationary within space 65 for a predetermined time interval, in position to be toasted, while the carriage is being retracted.

When the carriage has moved fully to its retracted position, the forward extension 48 of that side member 46 located above switch 74 will trip the switch handle 76 in an opposite direction, again reversing the motor so that the carriage once again begins its forward movement. The forward sets of fingers, during the forward movement of the carriage, will engage the rear ends of the previously advanced slices, and will cause the same to be ejected through the opening 18 while new slices are, at the same time, being advanced by the rear sets of fingers to take their place between the heating elements.

An important characteristic of the invention may now be noted, having regard to the length of time that bread slices remain in position to be toasted. Referring to Figure 5, when the carriage is being retracted the switch arms 96, 98 are in the position shown in this figure of the drawing. As a result, current is flowing at this time through lead 78, motor 32, lead 82, switch arm 96, variable resistor 84, lead 86, series field 88, lead 90, terminal 104, switch arm 98, lead 99, and power lead 94.

In other words, during the retraction of the carriage, the variable resistor is brought into the motor circuit, having the effect of slowing (or, if desired, increasing) the motor speed during the retraction of the carriage to a predetermined extent, thus providing a means for regulating the toasting time.

This will be apparent from the fact that when the resistor is adjusted to an extent to slow the motor to minimum speed during the retraction of the carriage, the carriage will take a maximum amount of time in moving from its dotted line to its full line position of Figure 2, thus increasing the amount of time the advanced bread slices are disposed in position to be toasted. Adjustments may be made in the motor speed during the retraction of the carriage, and this will correspondingly adjust the time interval during which bread slices remain in position to be toasted, thus controlling the shade of toasting.

When the motor is reversed by the full retraction of the carriage, and the carriage begins to move forwardly, the resistor is taken out of the circuit. This is true because arms 96, 98 will now be in engagement with terminals 102, 106. In these circumstances, the current flow is as follows: through lead 78, motor 32, lead 82, switch arm 96, terminal 102, lead 90, series field 88, lead 86, lead 92, terminal 106, switch arm 98, lead 99, and lead 94.

Both when the motor is advancing and retracting the carriage, the series of heating elements 110 are continuously energized, since at all times, there will be a current flow (assuming main switch 80 is closed) through lead 78, the series of heating elements 110, lead 108, and lead 94.

It will be seen from the above that the device is particularly adapted for toasting two slices of bread simultaneously and ejecting them simultaneously, to facilitate their use in sandwiches, orders of toast, etc. Two loaves of bread are thus accommodated in a highly compact, simplified assembly, and of importance is the fact that conveyor chains, gears, etc. are omitted entirely. Of further importance is the fact that the shade of toasting is adjusted by the variable resistor, to control the overall length of time that the carriage moves through a full cycle from its fully retracted position, to its fully advanced position and back to its retracted position. This adjustment of the overall length of time needed to complete a single cycle is effected, it will be observed, without changing at any time the speed with which bread slices are advanced from the bottom of the stack to toasting position. In other words, the variation in the carriage cycle is effected entirely during the retraction of the carriage, and the speed of forward movement of the carriage is unaffected. There will thus be a desirable minimum of time involved in advancing a bread slice from the bottom of the stack to toasting position, or in advancing a slice from toasting position to ejected position.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed as new is as follows:

1. An automatic bread toaster comprising a housing formed with an ejection opening and with a well for receiving a stack of bread slices, said housing having a heating space between the well and ejection opening; a trackway extending within the housing below the well for supporting said stack and for guiding the lowermost slice of the stack through said space to the ejection opening; heating means mounted within the housing between the ejection opening and well; and means for advancing said lowermost slice by steps from the well to the heating space, and from the heating space through the ejection opening, including a carriage slidably mounted within the housing, front and rear fingers on the carriage, the front finger being disposed for engaging a slice within the heating space and shifting the same through the ejection opening and the rear finger being disposed for engaging the lowermost slice of the stack and advancing the same into the heating space, a motor, and a driving connection between the motor and carriage for slidably advancing and retracting the carriage, and carriage operated control means operatively connected to said motor for causing said carriage to be advanced at one speed and be retracted at a different speed.

2. An automatic bread toaster comprising a housing formed with an ejection opening and with a well for receiving a stack of bread slices, said housing having a heating space between the well and ejection opening; a trackway extending within the housing below the well for supporting said stack and for guiding the lowermost slice of the stack through said space to the ejection opening; heating means mounted within the housing between the ejection opening and well; a carriage mounted within the housing for reciprocating movement in a path paralleling the trackway; front and rear fingers on the carriage, the front finger being disposed for engaging a slice within the heating space and shifting the same through the ejection opening and the rear finger being disposed for engaging the lowermost slice of the stack and advancing the same into the heating space; a reversing motor; a driving connection between the motor and carriage operative for reciprocating the carriage within the housing; and carriage operated control means operatively connected to said motor for causing said carriage to be advanced at one speed and to be retracted at a different speed.

3. An automatic bread toaster comprising a housing formed with an ejection opening and with a well for receiving a stack of bread slices, said housing having a heating space between the well and ejection opening; a trackway extending within the housing below the well for supporting said stack and for guiding the lowermost slice of the stack through said space to the ejection opening; heating means mounted within the housing between the ejection opening and well; a carriage mounted within the housing for reciprocating movement in a path paralleling the trackway; front and rear fingers on the carriage, the front finger being disposed for engaging a slice within the heating space and shifting the same through the ejection opening and the rear finger being disposed for engaging the lowermost slice of the stack and advancing the same into the heating space; a reversing motor mounted within the housing; a driving connection between the motor and carriage responding to reversal of the direction of operation of the motor to effect reciprocating movement of the carriage within the housing; and carriage operated control means operatively connected to said motor for causing said carriage to be advanced at one speed and retracted at a different speed.

4. An automatic bread toaster comprising a housing formed with an ejection opening and with a well for receiving a stack of bread slices, said housing having a heating space between the well and ejecting opening; a trackway extending within the housing below the well for supporting said stack and for guiding the lowermost slice of the stack through said space to the ejection opening; heating means mounted within the housing between the ejection opening and well; a carriage mounted within the housing for reciprocating movement in a path paralleling the trackway; front and rear fingers on the carriage, the front finger being disposed for engaging a slice within the heating space and shifting the same through the ejecting opening and the rear finger being disposed for engaging the lowermost slice of the stack and advancing the same into the heating space; a reversing motor mounted within the housing; and a driving connection between the motor and carriage responding to reversal of the direction of operation of the motor to effect reciprocating movement of the carriage within the housing, comprising a screw journalled in the housing and driven by the motor, and a follower threadedly engaged with the screw and secured to the carriage, a reversing switch in circuit with the motor, said switch including an operating handle disposed in the path of the carriage in position to be thrown by the carriage at opposite limits of the reciprocating movement of the carriage, a variable resistor electrically connected by the switch in circuit with the motor in one direction of operation of the motor for adjusting the speed of movement of the carriage when the carriage is being shifted in one direction within its path of reciprocating motion.

5. An automatic bread toaster comprising a housing formed at one end with an ejection opening of a size to permit simultaneous ejection of side-by-side bread slices therethrough, and further formed with an upwardly opening well proportioned to receive side-by-side stacks of bread slices, said housing having a heating space between the well and ejection opening; parallel trackways extending within the housing below the well for supporting said stacks and for guiding the lowermost slices of the stacks through said space to the ejection opening; heating means mounted within the housing between the ejection opening and well in position to toast slices supported on both trackways; a carriage mounted within the housing for reciprocating movement in a path paralleling the trackways; said carriage being common to and extending within both of said trackways; a set of front and a set of rear fingers on the carriage, the front fingers being disposed in both respective trackways for engaging slices within the heating space and shifting the same through the ejection opening, and the rear fingers also being disposed in both trackways for engaging the lowermost slices of the stacks and advancing the same into the heating space; a reversing motor mounted within the housing; a driving connection between the motor and carriage responding to reversal of the direction of operation of the motor to effect reciprocating movement of the carriage within the housing; and a reversing switch in circuit with the motor, said switch including an operating handle disposed in the path of the carriage in position to be thrown thereby at opposite limits of the reciprocating movement of the carriage, a variable resistor electrically connected by the switch in circuit with the motor in one direction only in which the motor operates for adjusting the speed of movement of the carriage when the carriage is being shifted in one direction within its path of reciprocating motion.

References Cited in the file of this patent

UNITED STATES PATENTS

| | | |
|---|---|---|
| 1,115,421 | Ferguson | Oct. 27, 1914 |
| 1,512,122 | Marcel | Oct. 21, 1924 |
| 1,797,628 | Whiting | Mar. 24, 1931 |
| 2,014,595 | Simmons | Sept. 17, 1935 |
| 2,151,401 | Belcder | Mar. 21, 1939 |
| 2,188,309 | Pentecost | Jan. 30, 1940 |
| 2,588,851 | Compass | Mar. 11, 1952 |